US007426989B2

(12) United States Patent
Krampl

(10) Patent No.: US 7,426,989 B2
(45) Date of Patent: Sep. 23, 2008

(54) ESCALATOR OR MOVING WALK WITH ROPELIKE TIEDOWN

(75) Inventor: David Krampl, Vienna (AT)

(73) Assignee: Inventio AG, Hergiswil (CH)

( * ) Notice: Subject to any disclaimer, the term of this patent is extended or adjusted under 35 U.S.C. 154(b) by 0 days.

(21) Appl. No.: 11/407,316

(22) Filed: Apr. 19, 2006

(65) Prior Publication Data

US 2006/0254878 A1 Nov. 16, 2006

(30) Foreign Application Priority Data

Apr. 19, 2005 (EP) ................................. 05103151

(51) Int. Cl.
*B65G 15/00* (2006.01)

(52) U.S. Cl. ...................................................... 198/321

(58) Field of Classification Search ................. 198/321, 198/322, 323, 324, 325, 326, 327, 328, 329, 198/330, 331, 332, 333, 334, 335, 336, 337, 198/338

See application file for complete search history.

(56) References Cited

U.S. PATENT DOCUMENTS

| | | | | |
|---|---|---|---|---|
| 3,621,970 A * | 11/1971 | Johnson et al. | ............. | 198/336 |
| 3,861,514 A * | 1/1975 | Ling | .......................... | 198/321 |
| 3,991,877 A * | 11/1976 | Kraft et al. | .................. | 198/335 |
| 4,519,490 A * | 5/1985 | White | ........................ | 198/333 |
| 4,564,099 A * | 1/1986 | Uozumi | ...................... | 198/323 |
| 4,674,619 A * | 6/1987 | Nakazawa et al. | .......... | 198/331 |
| 5,496,086 A * | 3/1996 | Adrian et al. | ................. | 294/65 |
| 6,065,583 A * | 5/2000 | Hoashi et al. | ............... | 198/334 |
| 6,105,748 A | 8/2000 | Pallinger et al. | | |
| 6,374,981 B1 | 4/2002 | Gschwendtner et al. | | |
| 6,527,098 B2 | 3/2003 | Krampl | | |
| 6,637,580 B1 * | 10/2003 | Sneed | ........................ | 198/326 |
| 6,685,001 B2 | 2/2004 | Krampl | | |
| 2003/0000800 A1 * | 1/2003 | Krampl | ...................... | 198/321 |

FOREIGN PATENT DOCUMENTS

| | | |
|---|---|---|
| DE | 709291 | 8/1941 |
| JP | 63 282093 | 11/1988 |

* cited by examiner

*Primary Examiner*—Joe Dillon, Jr.
(74) *Attorney, Agent, or Firm*—Schweitzer Cornman Gross & Bondell LLP

(57) ABSTRACT

An escalator or moving walk has a truss that is supported in the area of its extreme ends. In the area between its two extreme ends, the truss has at least one tension element which, at a first end, is connected mechanically to the truss, and at a second end is connected to a fastening point. The tension element is constructed and tensioned such that it exerts a tensile force on the truss that acts at least partly in the direction of the earth's gravitational force.

7 Claims, 5 Drawing Sheets

ESCALATOR OR MOVING WALK WITH ROPELIKE TIEDOWN

The present invention relates to an escalator or moving walk with a truss that is supported at its extreme ends.

BACKGROUND OF THE INVENTION

The truss of a conventional escalator or conventional moving walk can only bridge a certain distance. Provision of a supporting column in the middle of the truss has therefore been known for a long time (see FIG. 3 of DE 709291 C1 (1941)). Such a column is typically designated a midpoint support. If even longer escalators and/or moving walks are to be constructed, more supporting columns are needed. Both fixed and movable midpoint supports are known.

Such constructions are disadvantageous, in that such midpoint supports are mechanically complex and may also be heavy. Their installation is also quite complex. Furthermore, in certain situations, state-of-the-art midpoint supports are undesirable for aesthetic reasons.

There are, however, other trusses that are supported from above by an overhead suspension. A corresponding example is known from EP patent application EP 1 270 490 A1. Although this type of suspension allows the space below the truss to be kept free of interfering elements, it requires additional space in the area above the escalator or moving walk. A complex foundation must also be provided for the suspension.

An objective of the present invention is to present an escalator or moving walk of the type stated at the outset that requires no supports or complex foundation but can nonetheless bridge greater distances than usual to date.

A further objective of the invention is to present an escalator or moving walk of the type stated at the outset that remains stable even in the event of an earthquake.

BRIEF DESCRIPTION OF THE INVENTION

According to the invention, the foregoing and other objectives are fulfilled in a moving walk or escalator of the type stated at the outset by the truss of the moving walk or escalator having at least one tension element in the area between the two extreme ends. At a first end, the tension element is mechanically fastened to the truss, and at a second end to a fastening point that is, for example, in the area of the floor beneath the moving walk or escalator. According to the invention, the tension element is executed in such manner that it exerts on the truss a tensile force that acts at least partly in the direction of the earth's gravity. When suitably dimensioned and executed, this tension element serves as a sort of "virtual midpoint support".

An advantage of the invention is that the "virtual midpoint support" according to the invention can be easily and quickly installed. Moreover, depending on the embodiment, only a few components are needed, all of which can be easily manufactured and are therefore inexpensive.

In addition, the pretension that is provided by the tension element reduces the tendency of the moving walk to oscillate or vibrate. Undesirable resonances can be suppressed. Should a tension element with an upright spring be used, the spring can serve to provide stability.

A particular advantage of the invention is to be seen in that the moving walk or escalator is substantially more resistant to earthquakes than previous arrangements. Often, a moving walk or escalator rests freely on one or both of its extreme ends (where the supports are usually provided) or in a guide on the story floors. By means of the tensile force of the tension element, the moving walk or escalator in accordance with the present invention is fixed and held securely even in the event of an earthquake. In the event of an earthquake, the pretensioned rope exerts a certain flexing and tension-limiting effect.

The use of a tension element also results in an elegant and slender appearance. The space beneath the escalator or moving walk is available for utilization. The tension element can be built into a substructure.

A further advantage of this construction is that, if desired, tensile rather than pressure forces are transmitted into the foundations (through the midpoint support) so that, for example, the ceiling of the story is not additionally loaded but rather its weight force is counteracted.

A main benefit of the invention is the partial to almost complete compensation of flexure under working load. This allows long-spanned and slender trusses to be realized. The tension ropes are then hardly perceived by the eye.

BRIEF DESCRIPTION OF THE DRAWINGS

Further characteristics and advantages of the invention are apparent from the following description of exemplary embodiments, in conjunction with the annexed drawings, wherein.

DETAILED DESCRIPTION OF THE INVENTION

Figure 1:
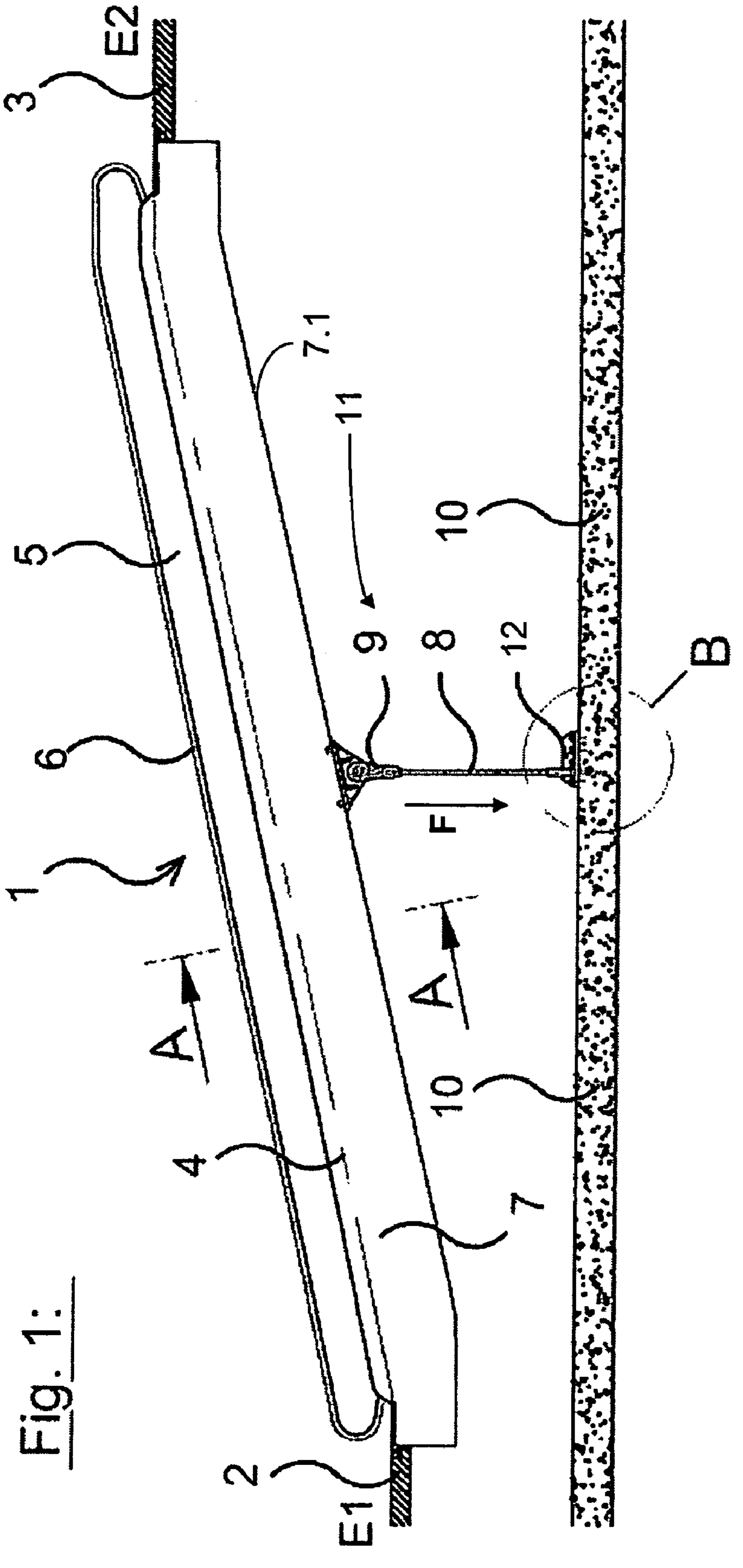
FIG. 1 is a representation of a moving walk according to the invention with a tension device arranged at its mid-point.

A moving walk is generally designated with a 1 (see FIG. 1). The term "moving walk" is used herein to encompass both transportation means in the nature of a bridge (moving walk) or in the nature of a stairway (escalator) such as are used for the transportation of people or objects. The invention can be used both on escalators that are arranged at an incline and typically connect two or more stories and on moving walks that are arranged horizontally or at an incline.

The moving walks according to the invention are characterized in having a truss 7 that has at least one tension element 11 in the area between the two extreme ends of the truss 7. The tension element 11 is fastened mechanically at a first end to the truss 7 and mechanically to a fastening point at a second end. The tension element 11 is executed in such manner that it exerts on the truss 7 a tensile force F that acts at least partly in the direction of the earth's gravity.

Before individual embodiments are described, the functioning of the tension element 11 is described. Stated simply, the tension element 11 replaces the suspension means and the supports of the prior art, even if this may at first sound questionable. The tension element 11 exerts on the truss 7 a tensile force F that acts at least partly in the direction of the earth's gravity. If the moving walk 1 is unladen, i.e. there is no load on the moving walk 1, this tensile force F provides a defined individual load on the truss 7. The individual load causes a certain flexing of the truss 7 in the direction of the tensile force F. If the moving walk 1 is now placed under load through, for example, people stepping on the moving walk, the truss 7 will tend to bend further in the direction of the earth's gravity. However, such a further flexure simultaneously causes a reduction in the effective tensile force F in the tension element 11 (if, for example, a tension rope serves as a tension element, the tension rope becomes slacker). On reduction of the effective tensile force F, the truss 7 of the moving walk 1 is relieved relative to its unladen state. In consequence, the truss 7 will raise the moving walk 1. These two effects compensate each other if the elements of the moving walk 1 are correspondingly dimensioned, i.e. the force in the direction of the earth's gravity caused by the load on the moving walk 1 is at least partially reduced by the restoring force of the truss 7 that arises immediately the effective tensile force F of the tension element 11 diminishes.

In other words, flexure of the truss 7 caused by loading is reduced by a reduction of the flexure caused by pretensioning of the truss 7. As described above, pretensioning of the truss 7 is effected by one or more tension elements 11 that must be so executed that, on loading of the moving walk 1, they reduce the effectively acting tensile force F (for example by slackening the tension rope).

It is preferable for the rigidity of the truss 7 (and any other supporting elements of the moving walk 1) and the extensibility of the tension element 11 to be so adapted to each other that the theoretical deformation resulting from an increase in the traffic load is of the same magnitude as the reduction of deformation resulting from the reduced tensile force (referred to as the effective tensile force) of the tension element 11. Stated simply, as postulated at the outset, a moving walk 1 is "supported" by the magnitude of the decrease $\Delta F$ in the tensile force (decrease in rope force) at the midpoint of the field. Depending on the dimensions of the individual components, the virtual supporting force adapts itself automatically over a wide range to the momentary level of traffic load.

The effective tensile force F of the tension element 11 is also at its maximum when the moving walk 1 carries only its own weight, and decreases as the load on the moving walk 1 increases (the tension rope becomes "slack"). The device with tension element according to the invention can therefore also be described as an "intelligent midpoint support" or "virtual midpoint support".

By suitable dimensioning of the individual components, the deformation of the moving walk 1 or of the supporting elements of the moving walk 1 that effectively occur under load are almost or completely reduced to zero.

The application of this invention is further described below by reference to various embodiments.

A moving walk 1 usually has on both sides of a longitudinal axis L a truss 7 that is preferably constructed in the form of a frame. The frame 7 is supported in the area of both of its extreme ends. As indicated in FIG. 1, the moving walk 1 can connect two stories E1 and E2. In the area of the landings 2 and 3 of these stories, supports, for example, can be provided to support the moving walk 1. These supports are not shown in the figures.

Figure 2:
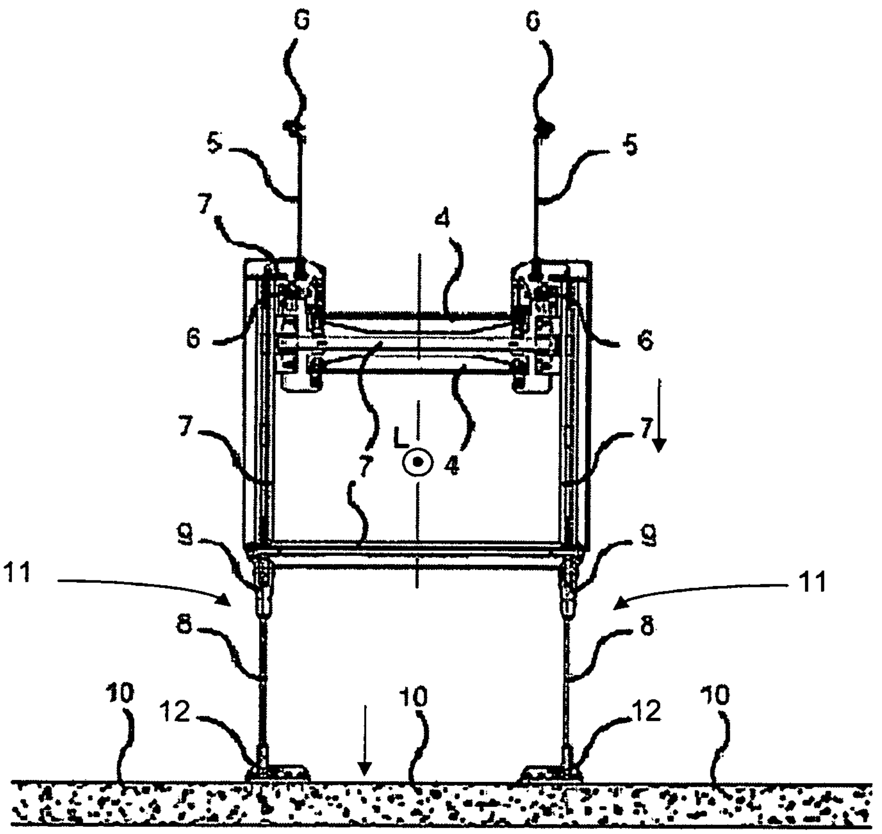
FIG. 2 is a cross-section view through a moving walk according to the invention with two tension devices arranged at its mid-point.

According to FIGS. 1 and 2, provided on each side of the moving walk 1 in the embodiment shown is a tension means 11. Each of the tension means 11 grips either directly, or via a connecting element 9, a stringer of the truss 7.

Further details of the embodiment shown in FIGS. 1 and 2 are described below. The moving walk 1 comprises a continuous moving band or a stair band consisting of steps whose position is referenced as 4 in FIG. 1. Optionally provided at the sides of the band are balustrades 5 with handrails 6. Provided on a lower edge 7.1 of the truss 7, or at the sides on each stringer, is a connecting element 9. Fastened to the connecting element 9 is a rope 8, for example a steel rope. This rope 8 ends at the other end at a fastening point 12. Here, too, a connecting element can serve to fasten the rope 8 to a floor 10, foundation, support, or other point.

In the example shown, the tension element 11 "stands" essentially upright on the floor 10. It can, however, also be arranged diagonally, provided that the condition is fulfilled that at least part of the tensile force F acts parallel to the earth's gravity. In a particular embodiment, the fastening point 12 may be located underneath and to the side adjacent to the moving walk 1, on a wall or column.

Figure 3:
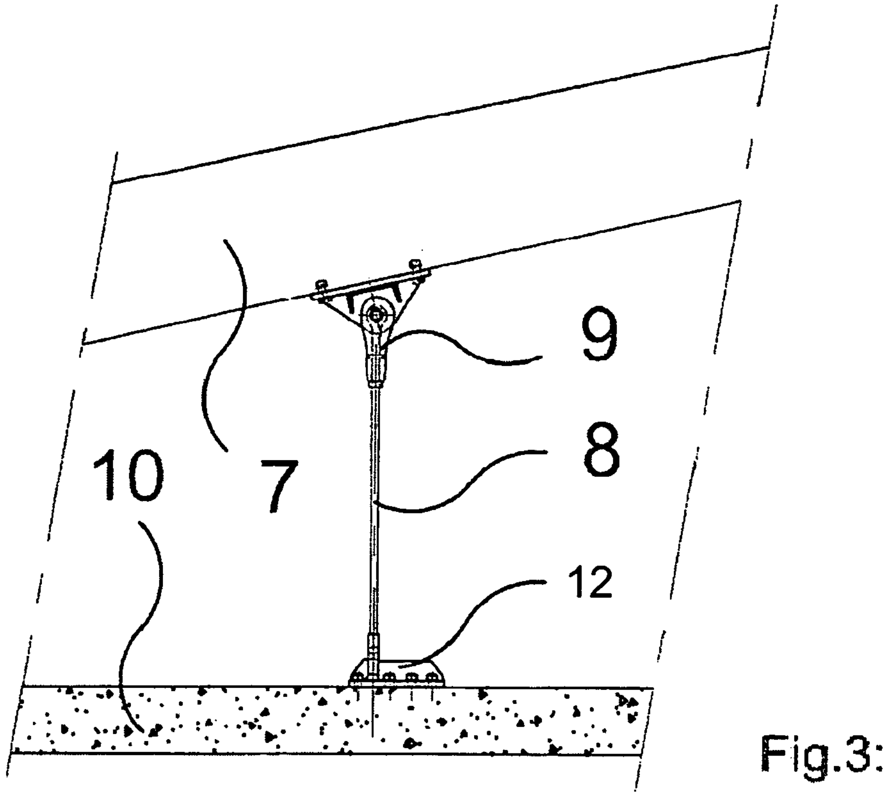
FIG. 3 is a detailed view of a first tension device according to the invention.

Shown in FIG. 3 is a detail B of the embodiment shown in FIGS. 1 and 2. The fastening element 9 is bolted, riveted, or otherwise fastened to the truss 7. As shown in FIG. 3, the rope 8 can be fastened to the fastening element 9 with an eye or by other means (for example, with a clamp or screw fastener). At its lower end, the rope 8 is fastened to a fastening element 12. The fastening element 12 is bolted, riveted, or otherwise fastened to the floor 10. The fastening element 12 can also be cast into the floor 10.

The tensile force is applied to the rope 8 by means of turnbuckles, sockets with left-hand or right-hand threads or the like, or by turning the tension rod (FIG. 1) by means of a special key and subsequently locking a nut by the fork head. The pretensioning is increased until a defined flexure is measured.

Figure 4:
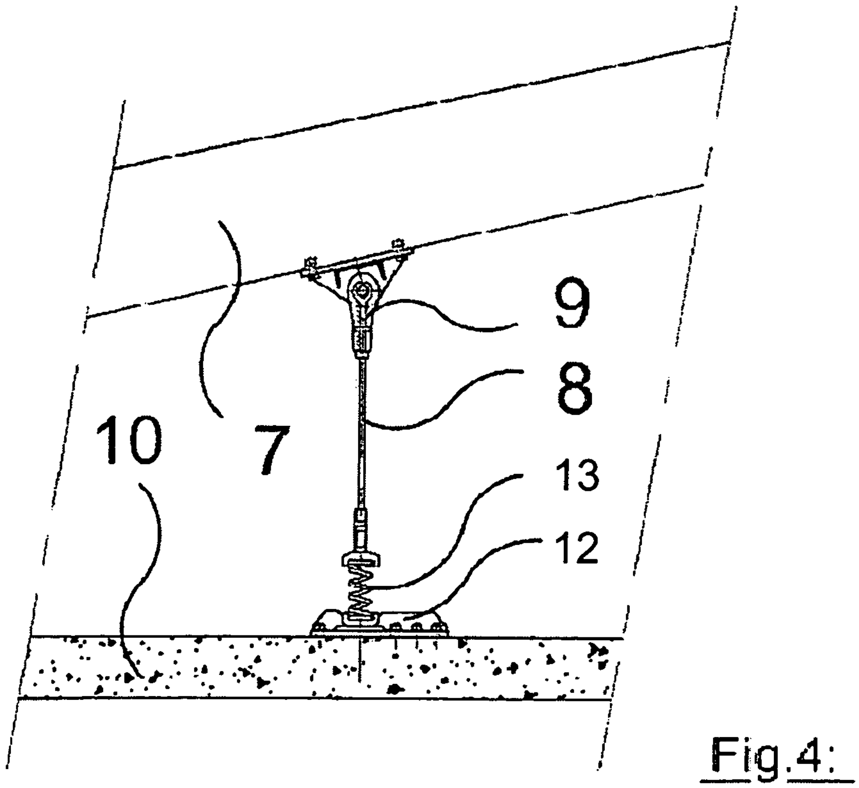
FIG. 4 is a detailed view of a second tension device according to the invention.

Shown in FIG. 4 is a detail B of an alternative embodiment. The fastening element 9 is bolted, riveted, or otherwise fastened to the truss 7. A combination of a rope 8 and a tension spring 13 (upright spring) is provided. In this case, the rope 8 is shorter than in FIG. 3. As shown in FIG. 4, it can be fastened to the fastening element 9 with an eye or by other means (for example, with a clamp or screw fastener). At its lower end, the rope 8 is fastened to the tension spring 13. A fastening element 12 fastens the tension spring 13 to the floor 10. The fastening element 12 can be fastened to the floor by bolting, riveting, or other means. The fastening element 12 can also be cast into the floor 10.

It is an advantage of the arrangement with tension rope 8 and tension spring 13 that the length of the rope 8 can be freely selected. By suitable selection of the rope/spring combination, the effect of temperature-dependent extension of the rope 8 can be controlled. Especially advantageous is an embodiment in which the spring force of the upright spring is adjustable by mechanical means.

Figure 5:
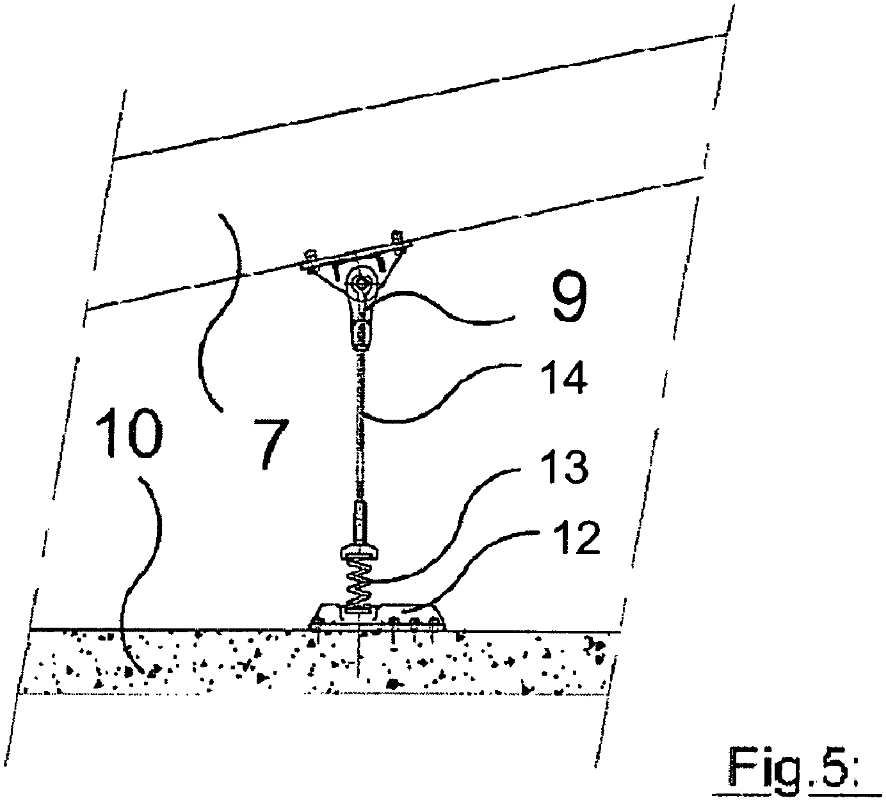
FIG. 5 is a detailed view of a third tension device according to the invention.

Shown in FIG. 5 is a detail B of another embodiment. The fastening element 9 is bolted, riveted, or otherwise fastened to the truss 7. A combination of a rod 14 and a tension spring 13 (upright spring) is provided. As shown in FIG. 5, the rod 14 can be fastened to the fastening element 9 with an eye or by other means (for example with a clamp or screw fastener). At its lower end, the rod 14 is fastened to the tension spring 13. The fastening element 12 fastens the tension spring 13 to the floor 10. The fastening element 12 can be fastened to the floor by bolting, riveting, or other means. The fastening element 12 can also be cast into the floor 10. Especially advantageous is an embodiment in which the spring force of the upright spring is adjustable by mechanical means.

The tension element can be arranged at the midpoint, half way between the two extreme ends of the truss 7, according to need. It is, however, also possible to arrange the tension element 11 at another point. It is also possible for more than only one tension element 11 to be provided.

As shown in FIG. 2, one tension element 11 per stringer of the truss 7 is provided to obtain a symmetrical load or pre-tension.

Figure 6:
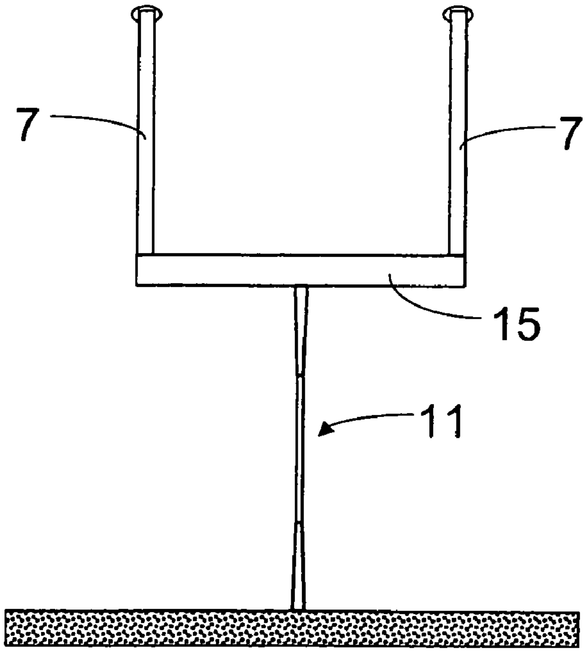
FIG. 6 is a cross-section view through a moving walk according to the invention with a tension device arranged at its mid-point.

Shown very diagrammatically in FIG. 6 is a method in which only one tension element 11 is located at the midpoint between the two stringers of the truss 7. The tension element 11 is preferably fastened to a crosspiece 15 that connects the two stringers.

Figure 7:
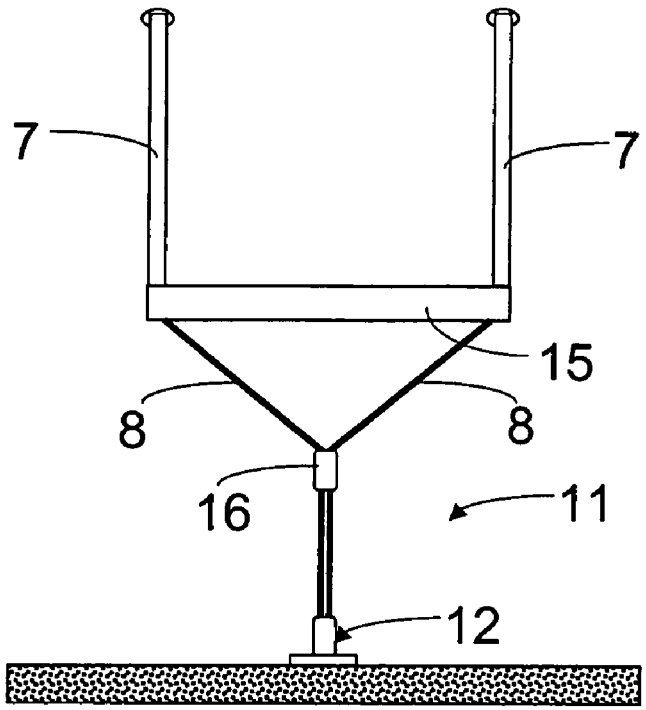
FIG. 7 is a cross-section view through a moving walk according to the invention with two tension devices arranged at its mid-point joined together in the form of a Y.

Shown very diagrammatically in FIG. 7 is a method in which the tension element 11 has two tension ropes 8 which are held together in the middle by an eye 16 or a clamp (double-stranded Y-shaped tiedown). This tension element 11 is preferably fastened to the stringers of the truss 7. To be able to absorb the forces caused by the tension elements 11, the truss 7 is preferably executed with reinforcement in the area where the force is transferred.

Self-evidently, depending on the magnitude of the tensile force F, a correspondingly deep, concreted foundation may be needed in the floor area. Additional lateral stability may be provided by optional diagonal struts, such as described in patent specification EP 0 866 019 B1.

Moving walks and escalators according to the invention can be used at trade fairs, exhibitions, railroad stations, and so on, to bridge great distances.

I claim:

1. A moving walk with at least one truss said walk and truss each having two corresponding extreme ends, which truss is supported in areas of the extreme ends and having means for minimizing the need for intermediate vertical supports, comprising in an area between the two extreme ends that the moving walk has at least one tension element mechanically connected at a first end to the truss and at a second end with a fastening point located other than at the moving walk and between the extreme ends, the tension element being constructed and oriented with respect to the truss to exert a tensile force on the truss that acts substantially in the direction of the earth's gravitational force and substantially opposing tension components at the extreme ends, thereby minimizing the need for intermediate vertical supports.

2. A moving walk according to claim 1, characterized in that the tension element serves as a virtual support for the truss.

3. A moving walk according to claim 1 or 2, characterized in that two tensile elements are provided and are arranged symmetrical to a longitudinal axis of the moving walk.

4. A moving walk according to claim 1 or 2, characterized in that the tension element comprises at least one of a rope, a tension spring, and a rod.

5. A moving walk according to claim 1 or 2, characterized in that the moving walk is at an incline between its extreme ends and connects two stories to each other.

6. A moving walk according to claim 1 or 2, characterized in that the moving walk is horizontal between its extreme ends.

7. A moving walk according to claim 1 or 2, characterized in that two tensile elements are provided and are arranged symmetrical to a longitudinal axis of the moving walk.

* * * * *